US006839974B1

(12) United States Patent
Hitchcock

(10) Patent No.: US 6,839,974 B1
(45) Date of Patent: Jan. 11, 2005

(54) MULTI-FUNCTION LAYOUT SQUARE WITH LASER

(76) Inventor: James N. Hitchcock, 16202 Sky Blue La., Houston, TX (US) 77095

( * ) Notice: Subject to any disclaimer, the term of this patent is extended or adjusted under 35 U.S.C. 154(b) by 0 days.

(21) Appl. No.: 10/623,285

(22) Filed: Jul. 18, 2003

Related U.S. Application Data

(60) Provisional application No. 60/399,554, filed on Jul. 29, 2002.

(51) Int. Cl.[7] .............................. B43L 7/12; B43L 7/14; G01C 9/02
(52) U.S. Cl. ............... 33/473; 33/DIG. 21; 33/DIG. 1; 33/419; 33/451
(58) Field of Search ........................... 33/382, 418–426, 33/451, 464, 465, 471, 473, DIG. 1, DIG. 21, 371

(56) References Cited

U.S. PATENT DOCUMENTS

| | | | | |
|---|---|---|---|---|
| 1,691,118 A | * | 11/1928 | Lissy | 33/473 |
| 2,054,420 A | | 9/1936 | Hochman | 33/495 |
| 2,517,264 A | * | 8/1950 | Wake | 33/419 |
| 4,451,993 A | * | 6/1984 | Yauk | 33/464 |
| 4,593,475 A | * | 6/1986 | Mayes | 33/DIG. 1 |
| 4,745,689 A | * | 5/1988 | Hiltz | 33/DIG. 1 |
| 5,446,969 A | | 9/1995 | Terenzoni | 33/473 |
| 5,519,942 A | | 5/1996 | Webb | 33/DIG. 21 |
| 6,134,795 A | * | 10/2000 | Hitchcock | 33/451 |
| 6,308,428 B1 | * | 10/2001 | Creighton, III | 33/DIG. 21 |
| 6,330,752 B1 | * | 12/2001 | Ellam | 33/465 |
| 6,672,190 B2 | * | 1/2004 | Taylor | 33/471 |

* cited by examiner

Primary Examiner—G. Bradley Bennett
(74) Attorney, Agent, or Firm—Kenneth A. Roddy

(57) ABSTRACT

A multi-function layout square of modular construction having a laser that is capable of performing multiple functions is disclosed. The multi-function square has a metallic outer casing with magnetic properties, with a protractor plate slidably, pivotally, and removably attached by thumbscrews to the casing that can be moved and rotated with respect to the casing and slid linearly along a portion of the length of the casing. When the protractor plate is removed the casing may be used as a level, a plumb bob, a ruler, and a compass. When the protractor plate is attached the tool may be used as a framing square, roofing framing square or rafter square, and a gauge or scribe for straight lines, arcs, or circles. The laser, a switch, and a pair of bubble level vials are contained in a module installed at one end of the casing, and a second module containing batteries is removably installed at the other end of the casing. Each module has electrical contacts that engage the interior surface of the casing and contacts that engage the batteries when the modules are installed and abutted. When the switch is on, a circuit is completed through the metallic casing, which electrically connects the batteries to the laser. The casing may be suspended vertically from a support surface by passing a string or wire through a bore in one of the thumbscrews, may be mounted on a tripod, or may be magnetically attached to metal objects.

16 Claims, 5 Drawing Sheets

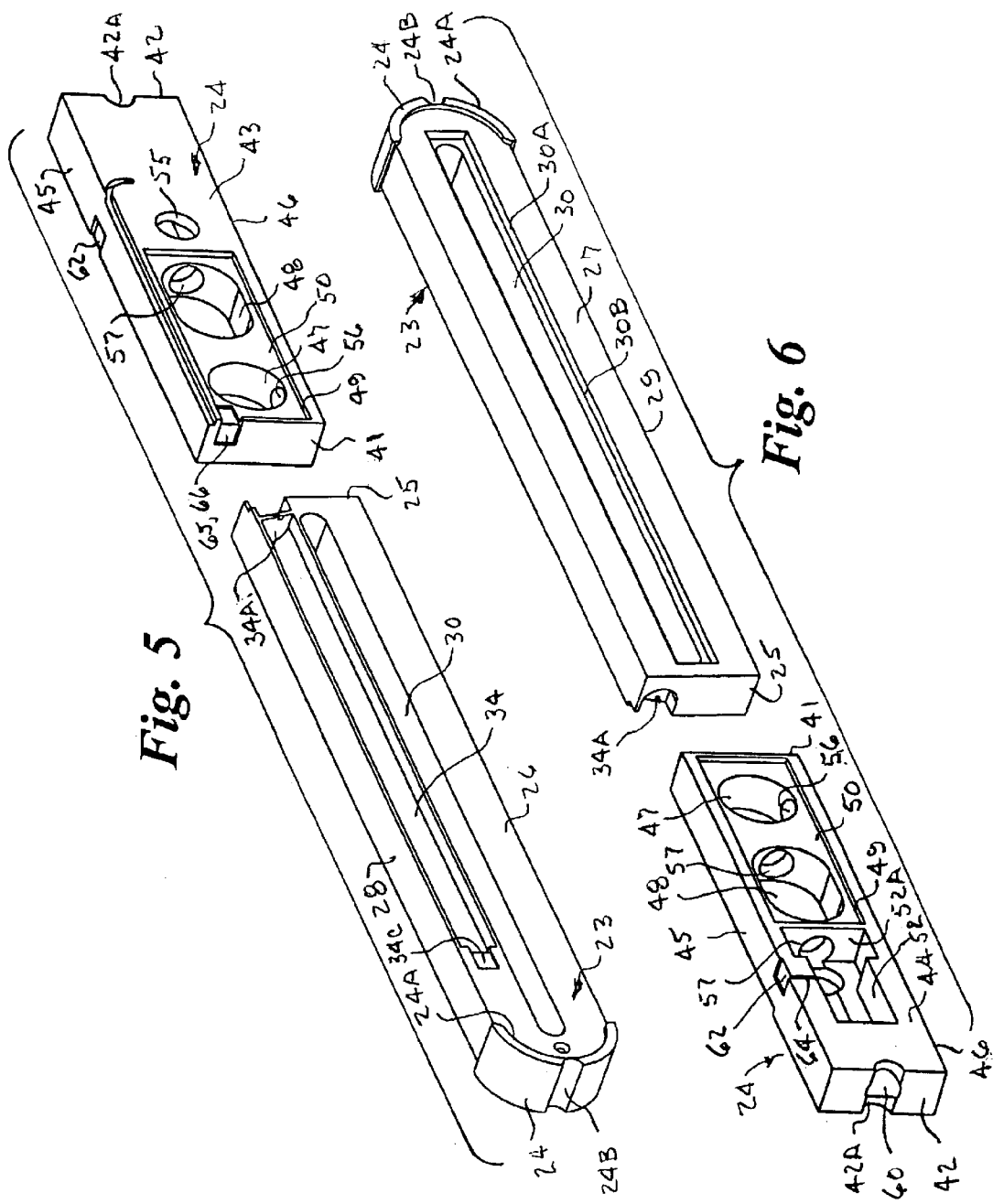

MULTI-FUNCTION LAYOUT SQUARE WITH LASER

CROSS REFERENCE TO RELATED APPLICATION

This application claims priority of U.S. Provisional Application Ser. No. 60/399,554, filed Jul. 29, 2002

BACKGROUND OF THE INVENTION

1. Field of the Invention

This invention relates generally to apparatus for use in construction of commercial, industrial, and residential buildings, and more particularly, to a multi-function layout square of modular construction which contains bubble levels and a laser and is capable of being used for a variety of different tasks.

2. Brief Description of the Prior Art

During the course of constructing commercial, industrial and residential buildings, various different multi-purpose layout squares are employed. Generally, each tool is used to address one task. For example, during construction of a roof, a construction worker will use a framing square, a rafter square, a level, a gauge, a ruler, a plumb bob, and in some instances, a compass to scribe the cut line for arcs or circles. Because of the number of different tools that must be transported to the work site, and carried by the construction worker, a single multi-purpose layout square that is capable of being used to accomplish multiple tasks has been sought There are several patents that disclose various levels having a laser light source and combination squares having a pivotal blade, or protractor, however none have the combination of structural and functional features of the present invention working together as a whole and which is capable of being used as a level, a plumb bob, a ruler, a framing square, roofing framing square or rafter square, and a gauge or scribe for straight lines, arcs, or circles.

Hochman, U.S. Pat. No. 2,054,420 discloses a combination drafting implement comprising a flat protractor with a flat scale superposed thereover and pivotally connected thereto for rotational movement relative to one another. The scale has a series of small apertures for receiving the sharp point of a pencil.

Terenzoni, U.S. Pat. No. 5,446,969 discloses a combination square and multi-purpose hand tool having an L-shaped body with a blade portion and a handle portion fixed perpendicular to the blade portion. A plate having an arcuate slot is pivotally attached in an elongate slot in the blade portion and extends from an outermost position parallel to the handle portion to an inner position folded against the blade portion. The plate moves with respect to the perpendicular leg (handle) of the L-shaped body to function as a clamp or as a caliper. Bubble levels are mounted in the pivotal plate. There is no laser beam light source, nor would it be possible for Terenzoni to be used as a plumb bob.

Webb, U.S. Pat. No. 5,519,942 discloses a device for performing leveling and transit functions having an elongated member with parallel spaced-apart top and bottom flat surfaces separated by a thickened web that includes several cutouts exposing bubble indicators arranged in a variety of orientations and includes a rotary module at one end movably mounting a laser beam generator. The rotary module has a passageway conducting a laser beam to a selected one of several slots or passageways provided in the end of the member. The web includes a housing adjacent to the rotary module enclosing electrical circuits, battery power supply and button controls for operation of the laser. A pivoting panel is coextensive with the top flat surface in a stored position while pivotal to a position normal to the top flat surface when used as a corner square. A thumb adjustment screw protrudes from the web through a flat surface to angle the device if desired.

The present invention is distinguished over the prior art in general, and these parents in particular by a multi-function layout square of modular construction having a laser that is capable of performing multiple functions. The multi-function square has a metallic outer casing with magnetic properties, with a protractor plate slidably, pivotally, and removably attached by thumbscrews to the casing that can be moved and rotated with respect to the casing and slid linearly along a portion of the length of the casing. When the protractor plate is removed the casing may be used as a level, a plumb bob, a ruler, and a compass. When the protractor plate is attached the tool may be used as a framing square, roofing framing square or rafter square for making rafter layouts, angle line cuts, seat notches (birds mouth), and a gauge or scribe for straight lines, arcs, or circles. The laser, a switch, and a pair of bubble level vials are contained in a module installed at one end of the casing, and a second module containing batteries is removably installed at the other end of the casing. Each module has electrical contacts that engage the interior surface of the casing and contacts that engage the batteries when the modules are installed and abutted. When the switch is on, a circuit is completed through the metallic casing, which electrically connects the batteries to the laser. The casing may be suspended vertically from a support surface by passing a string or wire through a bore in one of the thumbscrews, may be mounted on a tripod, or may be magnetically attached to metal objects.

SUMMARY OF THE INVENTION

It is therefore an object of the present invention to provide a multi-function layout square of modular construction that will allow workers to perform several different construction tasks using one single tool.

It is another object of this invention to provide a multi-function layout square of modular construction that will eliminate the need for workers to carry and store several different construction tools.

Another object of this invention is to provide a multi-function layout square of modular construction having an outer casing and an inner module installed therein with a laser, a switch, a pair of bubble level vials, and batteries contained in the inner module.

Another object of this invention is to provide a multi-function layout square of modular construction having an outer casing with a laser, a switch, and a pair of bubble level vials contained in a first module installed at one end of its outer casing, and a second module containing batteries that is removably installed at the other end of the casing.

Another object of this invention is to provide a multi-function layout square that can be used as level, a plumb bob, a ruler, a framing square, roofing framing square or rafter square for making rafter layouts, angle line cuts, seat notches (birds mouth), and a gauge and a gauge or scribe for straight lines, and as a compass for drawing arcs, or circles.

Another object of this invention is to provide a multi-function layout square having a metallic outer casing with magnetic properties which allows it to be attached and supported on metallic objects such a beams and girders.

A further object of this invention is to provide a multi-function layout square having a laser light source at one end that can be suspended vertically from a support surface for use a plumb bob, or may be mounted on a tripod, or may be magnetically attached to metal objects.

A still further object of this invention is to provide a multi-function layout square of modular construction that is simple in construction, inexpensive to manufacture, and rugged and reliable in operation.

Other objects of the invention will become apparent from time to time throughout the specification and claims as hereinafter related.

The above noted objects and other objects of the invention are accomplished by a multi-function layout square of modular construction having a laser that is capable of performing multiple functions. The multi-function square has a metallic outer casing with magnetic properties, with a protractor plate slidably, pivotally, and removably attached by thumbscrews to the casing that can be moved and rotated with respect to the casing and slid linearly along a portion of the length of the casing. When the protractor plate is removed the casing may be used as a level, a plumb bob, a ruler, and a compass. When the protractor plate is attached the tool may be used as a framing square, roofing framing square or rafter square for making rafter layouts, angle line cuts, seat notches (birds mouth), and a gauge or scribe for straight lines, arcs, or circles. The laser, a switch, and a pair of bubble level vials are contained in a module installed at one end of the casing, and a second module containing batteries is removably installed at the other end of the casing. Each module has electrical contacts that engage the interior surface of the casing and contacts that engage the batteries when the modules are installed and abutted. When the switch is on, a circuit is completed through the metallic casing, which electrically connects the batteries to the laser. The casing may be suspended vertically from a support surface by passing a string or wire through a bore in one of the thumbscrews, may be mounted on a tripod, or may be magnetically attached to metal objects.

BRIEF DESCRIPTION OF THE DRAWINGS

FIG. 5 is a perspective view of the first and second inserts of the multi-function layout square, shown from one side in an unassembled condition.

FIG. 6 is a perspective view of the first and second inserts of the multi-function layout square shown from the opposite side in an unassembled condition.

DESCRIPTION OF THE PREFERRED EMBODIMENTS

Figure 1:
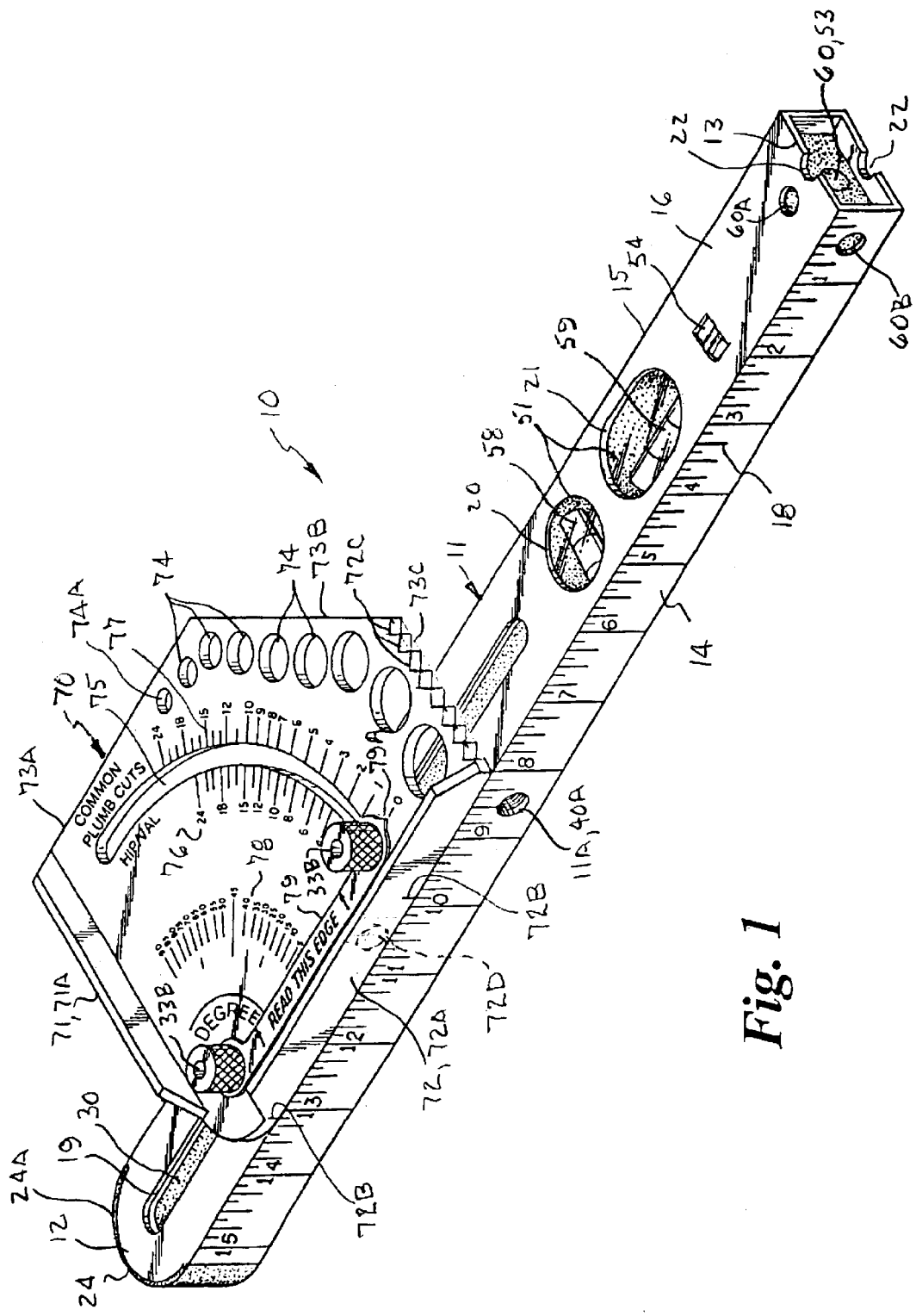
FIG. 1 is a perspective view of a multi-function layout square in accordance with the present invention, shown from the top and one end.
Figure 2:
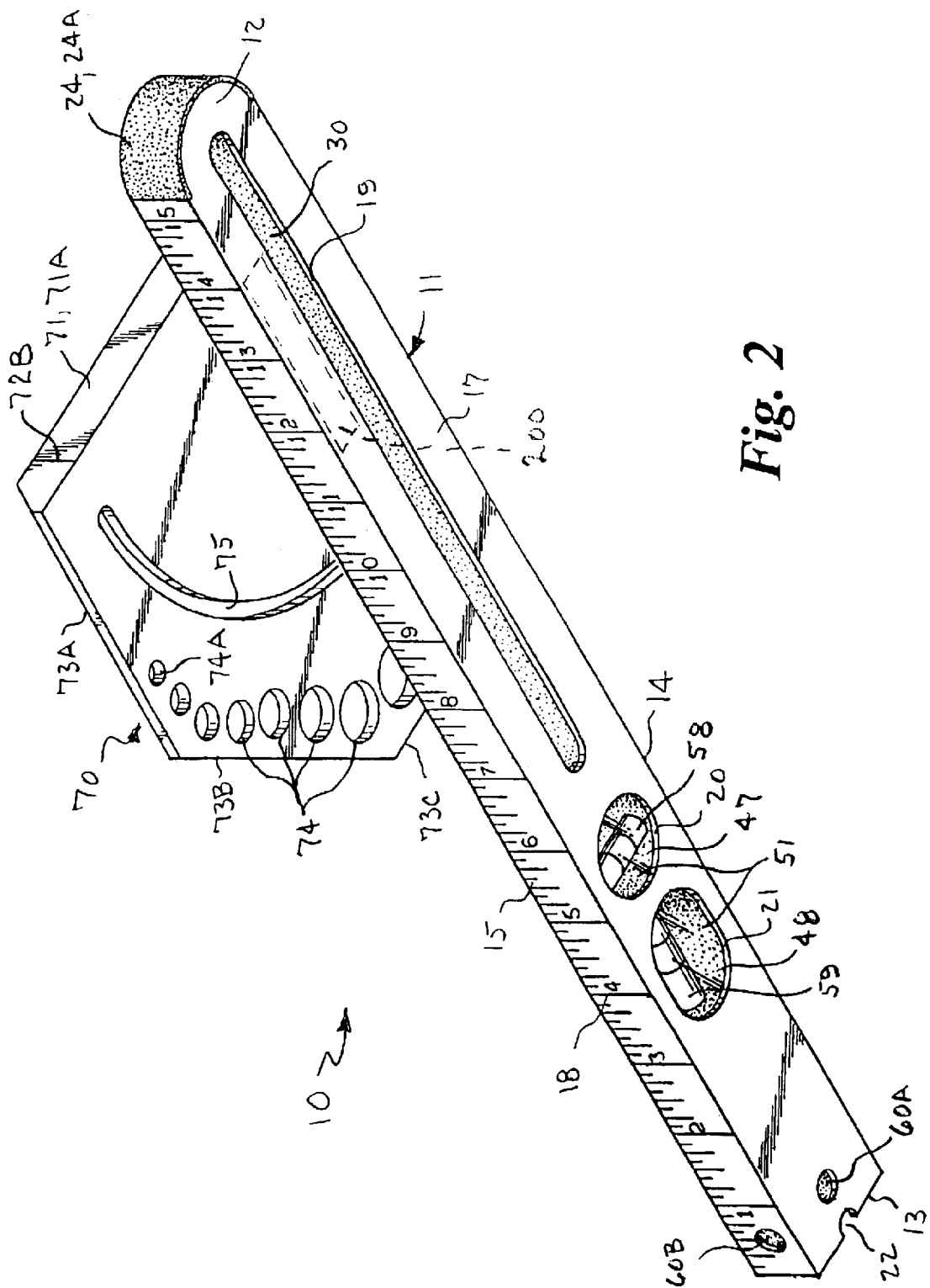
FIG. 2 is a perspective view of the multi-function layout square shown from the bottom and the opposite end.

Referring to the drawings by numerals of reference, there is shown in FIGS. 1 and 2, a preferred multi-function layout square 10, in accordance with the present invention. The multi-function layout square 10 is of modular construction and includes an outer housing or casing 11, with a protractor plate 70 pivotally and removable attached to the casing by a pair of thumbscrews 33 such that the plate is capable of being slidably moved and rotated with respect to the casing and slid linearly along a portion of the length of the casing. The protractor plate 70 can also be removed so that the casing 11 may be used as a level, a plumb bob, and ruler. When the protractor plate 70 is attached to the body 11, the tool may be used as a framing square, roofing framing square or rafter square for making rafter layouts, angle line cuts, seat notches (birds mouth), and a gauge or scribe for straight lines, arcs, or circles. The layout square 10 has a laser beam module 53 at one end, and a pair of bubble levels 58 and 59 in spaced relation along its length.

Having described the major components of the multi-function layout square 10, its modular construction will now be described.

Figure 3:
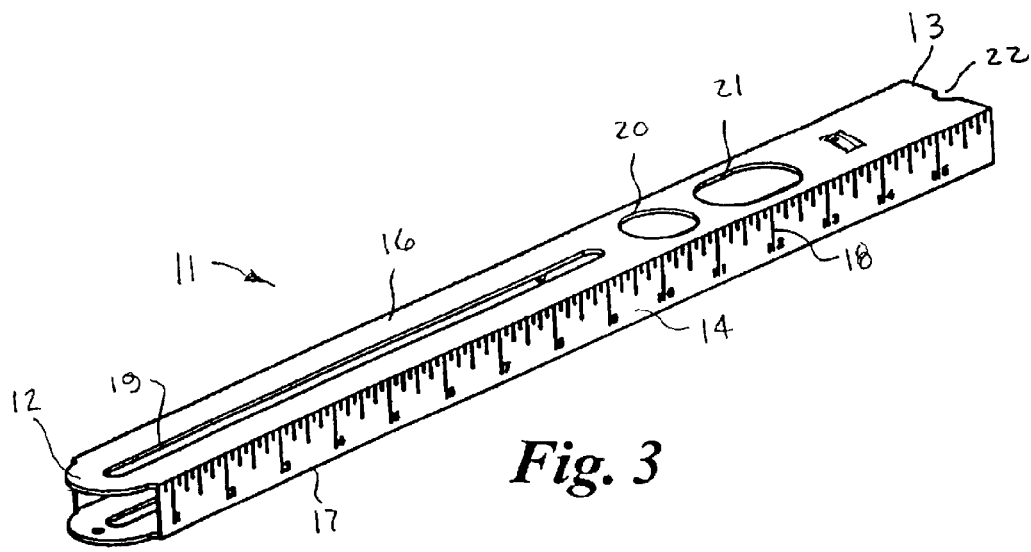
FIG. 3 is a perspective view of the outer casing of the multi-function layout square, shown from the top and one end.
Figure 4:
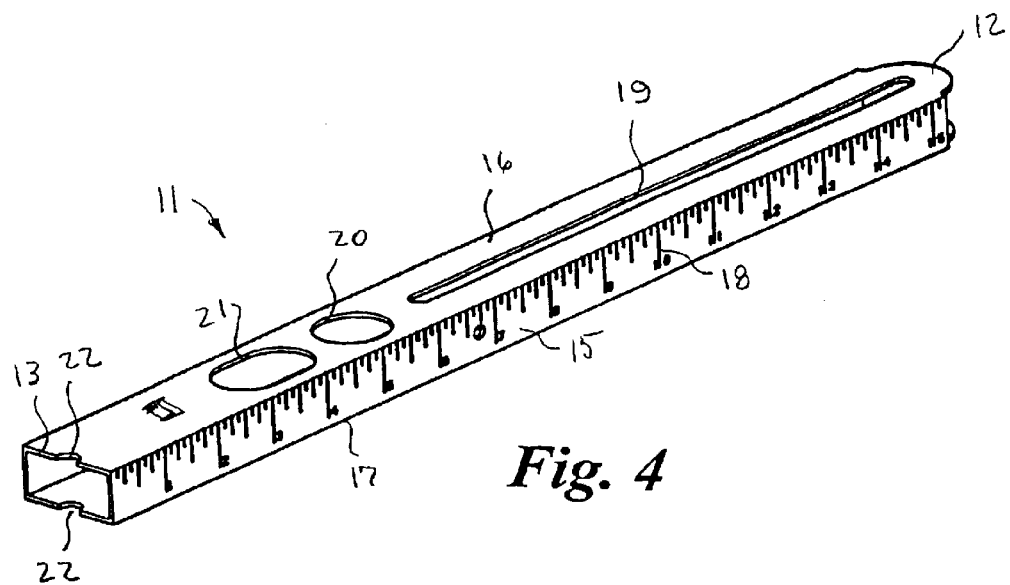
FIG. 4 is a perspective view of the outer casing of the multi-function layout square shown from the bottom and the opposite end.

Referring additionally to FIGS. 3 and 4, the outer housing or casing 11 is an elongate hollow metallic member having a generally rectangular transverse cross section. The casing 11 has a first rounded end 12, a second square end 13, a first side 14, a second side 15, a top surface 16, and a bottom surface 17. The first and second sides 14 and 15 are each provided with a scale 18, which is divided into standard inch or metric increments with corresponding numerical indicia thereon. In a preferred embodiment, the casing 11 is sixteen inches in length, one and one-half inches wide (distance between the sides), and three-quarters of an inch in height (distance between the top and bottom surfaces), however other it may be any size desired or necessary.

The top and bottom surfaces 16 and 17 of the casing 11 are each provided with a central longitudinal slot 19 near their rounded end 12 that extend a distance inwardly parallel with the longitudinal axis of the casing. The top and bottom surfaces 16 and 17 of the casing 11 are also each provided with a first circular aperture 20 and a second generally oval-shaped aperture 21 disposed in spaced part relation the between the slots 19 and the squared end 13. The squared ends 13 of the top and bottom surfaces are provided with inwardly facing semi-circular cutouts 22, which are sized to receive the side of a pencil.

Two-module Embodiment

In a two-module embodiment, the internal components of the multi-function layout square 10 are mounted in a first module 23 and a second module 24 formed of suitable plastic material, which are shown in FIGS. 5 and 6 in an unassembled condition. In the assembled condition, the modules 23 and 24 are installed in the outer casing 11, as described hereinafter.

The first module 23 is an elongate generally rectangular member having a rounded end 24, a flat end 25, a first side 26, a second side 27, a top surface 29, and a bottom surface 30. The rounded end 24 is provided with a semi-circular raised peripheral flange 24A which is engaged with, and surrounds the rounded end portion 12 of the casing 11 in the installed condition. Optionally, the outer periphery of the rounded end 24 of the module 23 may be provided with an inwardly facing semi-circular slot 24B, which is sized to receive a pencil. The first module 23 has a central longitudinal slot 30 formed therethrough from the first side 26 to the second side 7 that begins near its rounded end 24 and terminates near its flat end 25 parallel with the longitudinal axis of the module. A shallow rectangular recess 30A surrounds the slot 30 on the second side 27 of the module 23 to define a shoulder 30B. The recess 30A is wider than the slot 19 in the casing 11.

Figure 7:
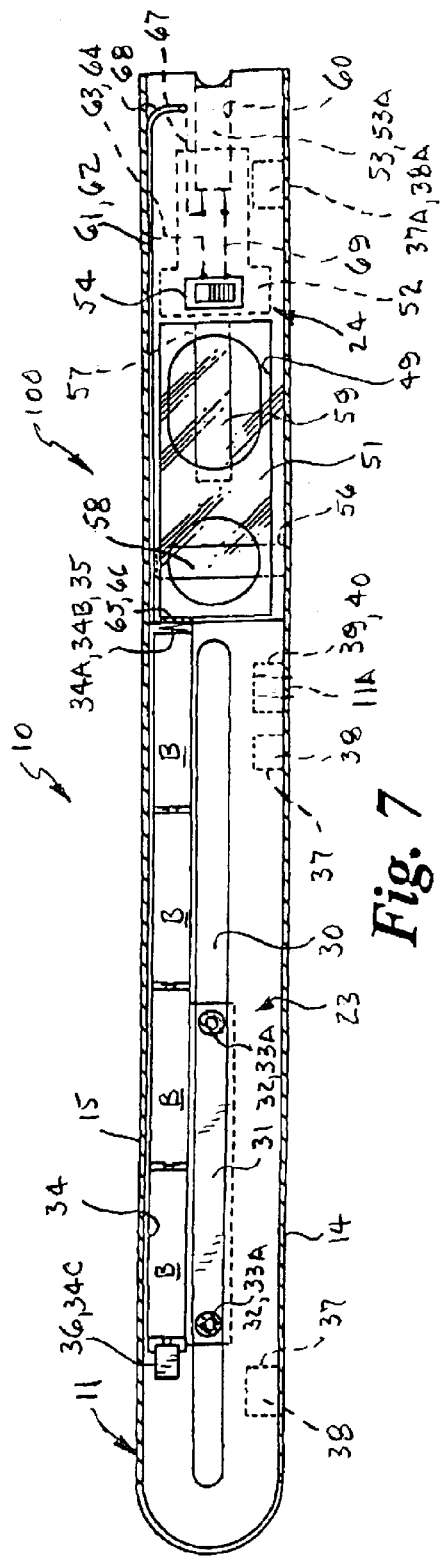
FIG. 7 is a longitudinal cross section view of the multi-function layout square in the assembled condition, with one side of the inserts shown in solid.
Figure 9:
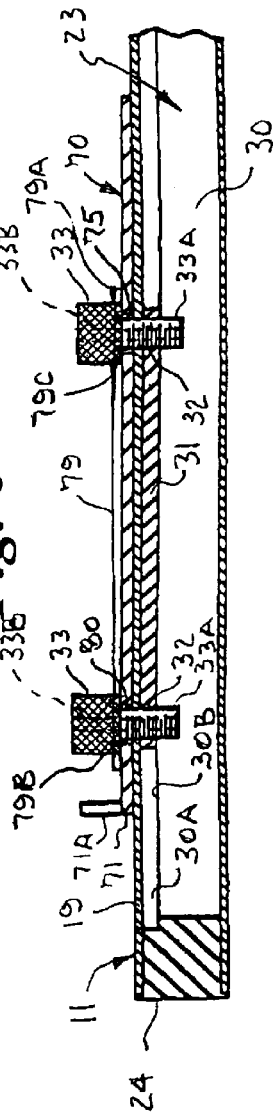
FIG. 9 is a cross section view through the protractor plate of the multi-function layout square taken along line 9—9 of FIG. 1.

As seen in FIGS. 7 and 9, a thin flat rectangular metal retainer plate 31 having a pair of longitudinally spaced threaded bores 32 therethrough is received in the recess 30A. The retainer plate 31 is wider than the slot 19 in the casing 11 and shorter than the length of the recess 30A such that when the module 23 is installed in the casing 11, the retainer plate 31 is captured beneath the slot 19 in the casing and slidably supported on the shoulder 30B for longitudinal movement therealong with its bores 32 centered between the sides of the slots 19 and 30. The shanks 33A of the thumbscrews 33 are threadedly received in the bores 32 of the retainer plate 31, as described hereinafter.

An elongate rectangular cavity 34 recessed into the first side 26 of the module 23 is disposed above the slot 30 and extends a distance inwardly from the flat end 25 of the module and a thin web 34A extends across the cavity a short distance from the flat end. The cavity 34 is sized to accommodate a series of batteries B. The outer side of the web 34A is provided with a small notch 34B. A small compression spring 35 is engaged intermediate its ends in the notch 34B and its inward facing end is engaged on the bottom of the last battery B. A small rectangular L-shaped metal contact 36 is mounted in a shallow rectangular recess 34C formed in the surface of the first side 26 at the end of the slot 34 nearest the rounded end 24. The inward facing leg of the contact 36 is engaged on the terminal of the first battery B, and its outer facing leg engages the interior surface of the metallic casing 11 when the module 23 is installed therein.

Figure 8:
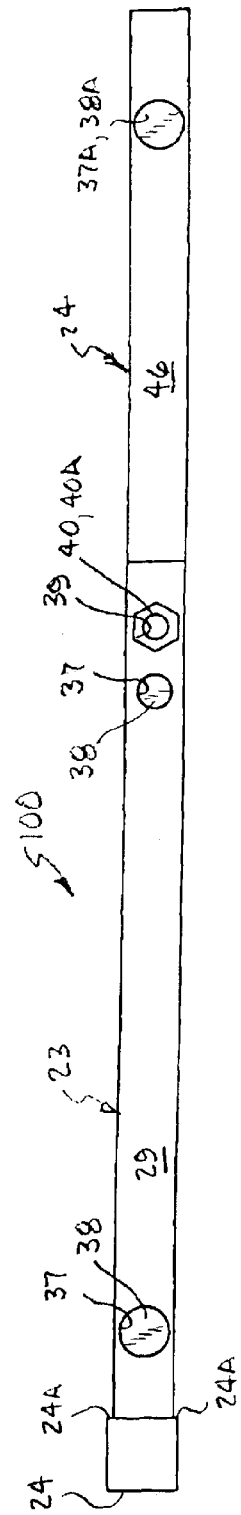
FIG. 8 is a bottom view of the first and second inserts of the multi-function layout square.

As shown in FIGS. 7 and 8, the bottom surface of the first module 23 is provided with a pair of longitudinally spaced cylindrical recesses 37, into each of which a cylindrical permanent magnet 38 is mounted. The outer facing ends of the permanent magnets 38 engage the interior surface of the metallic casing 11 when the module 23 is installed therein, so as to impart magnetic properties to the outer casing. The bottom surface of the first module 23 is also provided with a hexagonal recess 39, into which a hexagonal nut 40 is mounted. The nut 40 has an internally threaded bore 40A which is axially aligned with a bore 11A in the side wall 14 of the outer casing 11 when the module 23 is installed therein. The threaded bore 40A is sized to receive a mating male threaded fastener of a tripod mount so that multi-function layout square 10 may be mounted on a tripod.

The second module 24 is a generally rectangular member, shorter than the first module, having a first flat end 41, a second flat end 42, a first side 43, a second side 44, a top surface 45, and a bottom surface 46. The second flat end 42 may be provided with an inwardly facing semi-circular slot 42A, which is sized to receive the side of a pencil. The module 24 has a cylindrical aperture 46 and a generally oval-shaped aperture 47 spaced a short distance therefrom extending transversely therethrough from the first side 43 to the second side 44 near the first flat end 41. A shallow rectangular recess 49 surrounds the apertures 46 and 47 on each of the first and second sides 43,44 of the module 24 to define a shoulder 50. A thin flat rectangular plate 51 of transparent plastic is received in each recess 49 and supported on the shoulder 50.

A generally T-shaped cavity 52 recessed into the second side 44 of the module 24 is spaced a short distance from the oval-shaped aperture 48 defining a thin wall 52A therebetween. The longer leg of the cavity 52 terminates a distance from the second flat end 42 of the module 24. The T-shaped cavity 52 is sized to accommodate the electrical components of a laser power module 53 and an ON-OFF switch 54. The control button of the switch 54 extends through an aperture 55 in the first side 43 of the module 24, and an aperture in the casing 11.

As shown in FIGS. 7 and 8, a bore 56 extends upward from the bottom surface of the module 24 through the center of the circular aperture 47 along a vertical axis. A bore 57 extends inwardly from the T-shaped recess 52 through the center of the long axis of the oval-shaped aperture 48 along a horizontal axis. A first bubble level vial 58 is installed in the bore 56 along the vertical axis, and a second bubble level vial 59 is installed in the bore 57 along the horizontal axis.

The apertures 47 and 48 and the bubble level vials 58 and 59 are enclosed and protected by the thin transparent plates 51. A bore 60 extends inwardly through the center of the second flat end 42 of the module 24 into the T-shaped cavity 52 along a horizontal axis. A laser module 53 is installed in the bore 60 along the horizontal axis. The bottom surface 46 of the first module 23 may be provided with a cylindrical recesses 37A, into which a cylindrical permanent magnet 38A is mounted. The outer facing end of the permanent magnet 38A engages the interior surface of the metallic casing 11 when the module 24 is installed therein.

A small rectangular metal contact 61 is mounted in a shallow rectangular recess 62 formed in the top surface 45 of the second module 24 near its second side 44. One end of an insulated wire 63 connected to the metal contact 61 extends into the T-shaped cavity 52 through a slot 64 and its other end is connected to a first terminal of the switch 54.

A small L-shaped metal contact 65 is mounted in a shallow rectangular recess 66 formed in the first flat end 41 of the module 24 near its first side 43. In the assembled condition, when the first and second modules 23 and 24 are abutted together, the outer end of the spring 35 is engaged on the outer facing leg of the contact 65 on the second module 24. An insulated wire 67 connected at one end to the inward facing leg of the contact 66 is received in a small channel 68 that extends a distance along the edge of the top surface 45 and curves downward a short adjacent to the back side of the T-shaped cavity 52. The opposite end of the wire 67 extends through a hole at the curved end of the channel 68 and into the back side of the T-shaped cavity 52 and is connected to the one terminal of the laser module 53. The second terminal of the switch 54 is connected to the second terminal of the laser module 53 by an insulated wire 69.

Thus, the switch 54 and the laser module 53 are connected in series. In the assembled condition, when the first and second modules 23 and 24 are abutted together inside the metallic casing 11, and the switch 54 is turned on, polarized DC electrical current flows from the positive terminal of the battery pack B through the contact 36, through the metallic casing 11, back through the contact 61, through the wire 63, the series connected switch 54 and laser module 53 via wire 69, and through the wire 67, the contact 65, the spring 35 and to the negative terminal of the battery pack B to illuminate the laser module 53. When the switch 54 is turned off, the circuit is broken.

Single-module Embodiment

In the following discussion, the structural features described above are assigned the same numerals of reference, but the detailed description of all of the features will not be repeated again here to avoid repetition.

Referring again to FIGS. 7, 8 and 9, in a single-module embodiment, the opposed facing flat facing ends 25 and 41 of the two-module embodiment are eliminated and the two modules 23 and 24 are combined into a singular unitary module 100 formed of suitable plastic material which has substantially the same appearance as shown in the figures.

In this modification, the single module 100 is an elongate generally rectangular member having a rounded end 24, a flat end 42, a first side 26, a second side 27, a top surface 29, and a bottom surface 30. The rounded end 24 is provided with a semi-circular raised peripheral flange 24A which is engaged with, and surrounds the rounded end portion 12 of the casing 11 in the installed condition. The single module 100 has the same central longitudinal slot 30 formed therethrough surrounded by a shallow rectangular recess 30A on one side defining a shoulder 30B, which receives the retainer plate 31, as described previously. The module 100 has the same cylindrical aperture 46 and generally oval-shaped aperture 47 surrounded by a shallow rectangular recess 49 on each of the first and second sides of the module with a thin flat rectangular plate 51 of transparent plastic in each recess, and a first bubble level vial 58 is installed in the bore 56 along the vertical axis, and a second bubble level vial 59 is installed in the bore 57 along the horizontal axis which are protected by the transparent plates 51, as described previously.

The bottom surface of the single module 100 has the same cylindrical recesses 37, 37A that receive permanent magnets 38, 38A which engage the interior surface of the metallic casing 11 so as to impart magnetic properties to the outer casing, and a hexagonal recess 39 into which a hexagonal nut 40 is mounted so that multi-function layout square may be mounted on a tripod, as previously described.

The single module 100 has a cavity 52 recessed into the second side 44 of the module that accommodates the electrical components of a laser power module 53 and an ON-OFF switch 54 and the control button of the switch 54 extends through an aperture 55 in the first side 43 of the module 24 and an aperture in the casing 11, as described previously. Also as previously described, a laser module 53 is installed in the bore 60 extending from the cavity 52 along the horizontal axis.

The single module 100 also has the rectangular cavity 34 that is sized to accommodate a series of batteries B. However, in the single module embodiment, the module is not removed to change batteries. Instead, in this modification, the outer casing 11 is provided with a rectangular aperture covered by a removable plate 200, which fits flush with the surface of the casing, as indicated in dashed line in FIG. 2. Thus, the plate. 200 is removed to install or remove batteries into or from the battery cavity 34, rather than removing the first module 24 as required in the two-module embodiment.

Because the single module 100 does not require removal of the module from the outer casing 11 to install or remove the batteries, the intermediate electrical contact 61 is eliminated and current does not flow through the metallic casing 11. The wiring may be simplified somewhat. In this modification, the first metal contact 36 is mounted at one end of the battery cavity 34 and is configured to engage the terminal of the first battery (but not the metal surface of the casing 11), and the second metal contact 65 is mounted at the opposite end of the battery cavity and is configured to engage the outer end of the compression spring 35, the inner facing end of which is engaged on the bottom of the last battery B.

In this modification, one end of the insulated wire 63 is connected to the first metal contact 35 and extends into the cavity 52 through a slot or channel 64 formed in the surface of the module 100 and its other end is connected to a first terminal of the switch 54. The insulated wire 67 is connected at one end to the second contact 65 and is received in a small channel 68 formed in the surface of the module 100 and its opposite end is connected to one terminal of the laser module 53. The second terminal of the switch 54 is connected to the second terminal of the laser module 53 by an insulated wire 69.

Thus, the switch 54 and the laser module 53 are connected in series. In the single module embodiment, when the switch 54 is turned on, polarized DC electrical current flows from the positive terminal of the battery pack B through the contact 36, through the wire 63, the series connected switch 54 and laser module 53 via wire 69, and through the wire 67, the contact 65, the spring 35 and to the negative terminal of the battery pack B to illuminate the laser module 53. When the switch 54 is turned off, the circuit is broken.

With either the two-module or single-module embodiment, when the laser module 53 is on, it emits a concentrated beam of light coextensive with the longitudinal axis of the multi-function layout square 10 extending from its end 13 to an object such as a wall, floor, or rafter located a distance from the square, and preferably remains on without assistance from the user until the switch is turned off. The laser 53 provides the user of the multi-function layout square 10 with the ability to align rafters and other structural components of a building with a reference point to make accurate measurements for cutting the components to be used to join the reference point to a structural component of the building.

For example, to make the measurements for a rafter, the multi-function layout square 10 is placed at the reference point and the laser beam is directed onto the structural component of the building. The multi-function layout square 10 is then adjusted until the light intersects the point of the structural component of the building that is to be aligned with the reference point. After alignment of the reference point and the structural component of the building are complete, the user can then use the multi-function layout square 10 to determine the angles at which the rafter must be cut. The laser 53 may also be used to align non-structural components such as cabinets, wallpaper, chair rails, base boards, etc.

Optionally, a laser beam splitter 53A may be installed in the bore 60 at the flat end 42 of the second module 24 or single module 100 or installed in a cavity adjacent the laser module 53 which will split the longitudinal horizontal component of the laser beam into a second beam that extends perpendicular to the longitudinal horizontal component of the beam, or splits it into a second beam that extends vertically perpendicular to the longitudinal horizontal component and a third beam that extends laterally perpendicular to the longitudinal horizontal component through respective vertically aligned and laterally aligned bores 60A and 60B in the module and the casing 11.

The vertical bubble level vial 58 and the horizontal bubble level vial 59 provide the multi-function layout square 10 with the ability to function as a level. It should be understood that additional vials oriented at different angles may also be provided.

Referring again to FIGS. 1 and 2, the slidable and rotatable protractor plate 70 enables the multi-function layout square 10 to function as a framing square, a rafter square and a gauge, as will be explained in greater detail below. The protractor plate 70 is a flat plate having two perpendicular sides 71 and 72 with flat raised extensions 71A and 72A, and three angular sides 73A, 73B, and 73C. A series of circular holes 74 of different diameters are formed through the plate 70 near the three angular sides for use as circle templates for drawing circles. In a preferred embodiment, the centerline of the smallest hole 74A is spaced a predetermined distance from the side 71 and raised extension 71A such that when the plate 70 is positioned with its side 71 flush with the side 14 of the casing 11, the centerline of the hole 74A will be 1¼" from the opposite side 15 of the casing whereby a pencil may be placed in the hole to draw a line on lumber that is to be cut that width.

An arcuate slot 75 is formed through the plate 70 inwardly from the circular holes. The protractor plate 70 is provided with seat cut calibrated markings 76 and plumb cur calibrated markings 77 along the sides of the slot 75, and angular degree calibrated markings 78 spaced inwardly a distance from the slot. A thin flat guide 79 with a pointed end 79A is provided for determining the angle 78 or cut markings 76,77 at which the protractor plate 70 is oriented with respect to the longitudinal axis of the casing body 11 to provide accurate measurements.

The flat raised extensions 71A and 72A on the perpendicular sides 71 and 72 of the protractor plate 70 may be provided with index marks 72B that are aligned and spaced to correspond to the centerlines of the thumbscrews 33 to accurately read the location of the protractor plate 70 with respect to the scales 18 on the first and second sides 14 and 15 of the outer casing 11. As shown in FIG. 1, one of the sides 73C of the protractor plate 70 may be provided with a series of incrementally spaced notches 72C at predetermined distances from one of the perpendicular sides 72 and raised extension 72A to function as a depth scale, whereby when removed from the outer casing, the side 72 may be placed on a flat surface such as a table saw table and the protractor plate supported vertically so as to adjust the height or cutting depth of the saw blade. Also, as indicated in dashed line in FIG. 1, one of the sides raised extensions 72A of the protractor plate 70 may be provided with a recessed small permanent magnet 72D which is flush with the flat surface of the extension to allow attachment of the protractor plate to metal surfaces and objects.

As described previously, the thin retainer plate 31 is slidably captured in the recess 30A. As best seen in FIG. 9, a hole 80 is formed in the protractor plate 70 near the intersection of the perpendicular sides 71 and 72, defining a pivot point. The thin flat guide 79 rests on the top surface of the protractor plate 70 and has a hole 79B near one end aligned with the pivot point hole 80, and a hole 79C near its pointed end aligned with the arcuate slot 75. The shank 33A of one thumbscrew 33 extends through the hole 79B the guide 79 and the hole 80 in the protractor plate 70, and the shank 33A of the other thumbscrew 33 extends through the hole 79C near the pointed end 79A of the guide 79 and the arcuate slot 75. The shanks 33A of the thumbscrews 33 are threadedly received in the threaded bores 32 of the thin slidable retainer plate 31, and, when tightened down, the slidable retainer plate 31, the guide 79 and the protractor plate 70 are clamped together beneath the underside of the heads of the thumbscrews to secure them in place. When the thumbscrews 33 are loosened, the protractor plate 70 may be pivoted about its pivot point through an angle of 90° on either side of the casing 11. The protractor plate 70 may also be slid relative to the casing along the longitudinal slots 19 and 30 when the thumbscrews 33 are loosened.

The protractor plate 70 may be oriented with respect to the longitudinal axis of the casing 11 using the laser beam as described above to simultaneously determine the angles at which the plumb cuts and the seat cuts need to be made for accurately cutting rafters for a roof. The seat cut is determined by identifying the angle at which the seat cut calibrated markings 76 are parallel with the guide 79. The seat cut calibrated marking that is parallel with the guide is the angle of the seat cut. The plumb cut is determined by identifying the plumb cut calibrated marking 77 that the pointed end 79A of the guide 79 identifies when the multi-function layout square 10 is in its desired or necessary orientation. Accordingly, the laser 53, in conjunction with the longitudinal casing 11 and the protractor plate 70 provide the user with the ability to accurately determine the plumb cut and the seat cut simultaneously.

Another advantage of the multi-function layout square 10 is its ability to accurately determine the plumb cut and seat cut of existing rafters without having to remove other structural components, e.g., roofing, to make the measurements. For example, during renovations, new rafters may have to be cut to extend a roof line. These new rafters must include plumb cuts and seat cuts identical to the existing rafters. Accordingly, it is necessary to accurately measure the plumb cut and seat cut of the existing rafters. The sliding protractor plate 70 allows the multi-function layout square 10 to be placed in areas with limited space, such as above existing rafters. Instead of removing a portion of the existing roof above the rafters to make the measurements, the protractor plate 70 may be positioned such that the longitudinal casing 11 can fit within the space below the existing roofing with the protractor plate oriented along the bottom of the existing rafter so that accurate plumb cut and seat cut measurements can be made.

As seen in FIGS. 1 and 9, a small bore 33B extends through the center of each thumbscrew 33 from end to end. A suspending means such as a nail, wire or string (not shown) may be passed through the bore 33B of either thumbscrew 33 to suspend the multi-function layout square 10 from a rafter or other structure to function as a plumb bob as described below in greater detail. The head of the thumbscrews 33 are provided with a knurled outer surface to facilitate griping when tightening and loosening the screws.

The tool may also function as a plumb bob either by loosening or removing the protractor plate 70. The thumbscrews 33 should be loosened sufficiently to allow the protractor plate to swing freely relative to the casing 11 with the rounded end of the tool facing upward. Removal of the 70 is accomplished by removing the thumbscrew 33, removing the protractor plate 70, and then reinstalling one of the thumbscrews into the thin retainer plate 31. The tool can then be suspended by inserting a suspension means (string or wire) through the bore 33B of the thumbscrew 33, and suspending the casing 11 therefrom such that its second end 13 containing the laser 53 is facing downward to direct the laser beam onto a surface beneath the casing body.

The permanent magnets 38, 38A impart magnetic properties to the casing 11 and allow the multi-function layout square 10 to be magnetically attached to a steel girder or beam, used in construction; and the scales 18 on the sides 14 and 15 of the casing may be used as a ruler, for measuring distances and/or for determining a center point, etc.

The threaded bore 40A accessible through the bore 11A in the side wall 14 of the outer casing 11 may be used to mount the multi-function layout square 10 to a tripod when desired.

The multi-function layout square 10 may also be used as a compass for drawing arcs or circles by placing a nail through the bore 33B of one of the thumbscrews 33 at the center point of the arc or circle to be drawn and placing a pencil vertically into the semi-circular cutout 22 at the end of the casing 22 and rotating the casing about the nail. The thumbscrew may be adjustably positioned and secured at various distanced relative to the end of the casing to make arcs or circles of the desired radius or diameter.

While this invention has been described fully and completely with special emphasis upon preferred embodiments, it should be understood that within the scope of the appended claims the invention may be practiced otherwise than as specifically described herein.

What is claimed is:

1. A multi-function layout square of modular construction comprising:

an elongate generally rectangular metallic outer casing having first and second ends, first and second sides, a top surface and a bottom surface defining a hollow interior with a longitudinal axis, an elongate longitudinal central slot in each said top and bottom surface near one end thereof parallel with the longitudinal axis of the casing, and a first and a second aperture in each said top and bottom surface spaced from said central slot disposed in longitudinally spaced apart relation;

an elongate generally rectangular non-metallic inner module retained in said casing hollow interior having first and second ends, first and second sides, a top surface and a bottom surface, an elongate longitudinal sliding slot formed therethrough from said top surface to said bottom surface in alignment with said casing central slot, a horizontal level vial and a vertical level vial mounted in said inner module in alignment with said first and second apertures of said casing, respectively;

a retaining member slidably disposed between said casing central slot and said module longitudinal sliding slot;

a removable protractor plate slidably and rotatably disposed on said casing top surface connected with said retaining member, and having an arcuate sliding slot therethrough;

first and second thumbscrews releasably connecting said protractor plate and its said arcuate slot, respectively, with said retaining member to allow linear sliding movement along said sliding slot and variable rotation of said plate about said first thumbscrew member with respect to said casing in a loosened condition and to secure said plate at selected locations and at selected rotated positions along the length of said casing in a tightened condition; and a scale on each of said casing first and second sides divided into increments with corresponding numerical indicia thereon.

2. The multi-function layout square according to claim 1, further comprising:

a switch aperture in said outer casing top surface;

an on-off switch unit mounted in said inner module disposed beneath said switch aperture and having a switch element accessible in said switch aperture;

a longitudinal bore extending inwardly from one of said first and second ends of said inner module parallel with the longitudinal axis of said casing;

a laser beam emitting unit mounted in said module adjacent to said longitudinal bore and connected in series with said switch unit; and a battery receiving cavity in said inner module for receiving at least one battery and having battery contacts connected with said switch unit and said laser beam emitting unit; wherein when said switch is turned on, a circuit is completed to energize said laser beam emitting unit with polarized DC electrical current to emit a concentrated laser beam coextensive with the longitudinal axis of said layout square extending from said one end, and when said switch is turned off, the circuit is broken.

3. The multi-function layout square according to claim 2, wherein said inner module comprises a first module removably received in said outer casing hollow interior and a second module retained therein, each having opposed facing ends in abutting relation;

said battery receiving cavity is disposed in said first module, a first one of said battery contacts is engaged on an interior surface of said outer casing, and a second one of said battery contacts is disposed on its said opposed facing end;

said second module has a first metal contact on an outer surface thereof engaged on an interior surface of said outer casing, and a second metal contact disposed on its said opposed facing end to engage said second one of said battery contacts on said first module opposed facing end when abutted therewith;

said on-off switch unit is mounted in said second module and has one terminal connected with said first metal contact;

said longitudinal bore and said laser beam emitting unit are disposed in said second module and said laser beam emitting unit is connected in series with a second terminal of said switch unit; and when said switch is turned on, a circuit is completed through the metallic outer casing and the battery contact and second metal contact on the opposed facing ends of said first and second modules to energize said laser beam emitting unit with polarized DC electrical current to emit a concentrated laser beam coextensive with the longitudinal axis of said layout square, and when said switch is turned off, the circuit is broken.

4. The multi-function layout square according to claim 2, further comprising:

beam splitting means mounted in said inner module adjacent to said laser beam emitting unit;

a perpendicular bore in said inner module extending outwardly from said beam splitting means perpendicular to said longitudinal bore; and a bore through said casing axially aligned with said perpendicular bore;

said beam splitting means splitting said laser beam into a longitudinal beam component coextensive with the longitudinal axis of said layout square and a second beam that extends perpendicular to the longitudinal component through said perpendicular bore in said inner module and aligned bore through said casing.

5. The multi-function layout square according to claim 2, wherein at least one of said thumbscrews has a bore extending longitudinally through its center adapted to receive suspension means for suspending said outer casing vertically therefrom to direct said laser beam onto a surface beneath said outer casing.

6. The multi-function layout square according to claim 1, wherein said protractor plate is a flat plate with two perpendicular sides with an aperture near the intersection of said perpendicular sides;

said arcuate sliding slot is disposed in radially spaced relation to said aperture and extends through an arc of 90°; and said first thumbscrew has a threaded shank extending through said aperture and threadedly engaged with said retaining member, and said second thumbscrew has a threaded shank extending through said arcuate sliding slot and threadedly engaged with said retaining member.

7. The multi-function layout square according to claim 6, further comprising:

seat cut calibrated markings and plumb cut calibrated markings along outer sides of said arcuate sliding slot, and angular degree calibrated markings spaced inwardly a distance from said arcuate sliding slot.

8. The multi-function layout square according to claim 7, further comprising:

a thin flat guide disposed on said protractor plate and connected near opposed ends to said retainer member by said first and second thumbscrews to allow sliding movement of said protractor plate relative thereto and terminating at a pointed end for determining the angle or cut markings at which the protractor plate is oriented with respect to the longitudinal axis of the casing body.

9. The multi-function layout square according to claim 6, further comprising:

a flat raised extension extending along each of said protractor plate perpendicular sides; and index marks on an outer face of each extension that are aligned and spaced to correspond to the centerlines of the thumbscrews to accurately indicate the location of the protractor plate with respect to the scales on said first and second sides of said outer casing.

10. The multi-function layout square according to claim 9, further comprising:

a permanent magnet mounted in at least one of said raised extensions for attaching said protractor plate to metal surfaces when removed from said outer casing.

11. The multi-function layout square according to claim 6, further comprising:

a series of circular holes of different diameter extending through said protractor plate spaced outwardly from said arcuate sliding slot to receive a pencil for drawing circles or marking widths.

12. The multi-function layout square according to claim 6, wherein said protractor plate has three angular outer sides spaced outwardly from said arcuate sliding slot extending between diverging outer ends of said perpendicular sides.

13. The multi-function layout square according to claim 12, further comprising:

a series of incrementally spaced notches at predetermined distances along one of said angular outer sides extending from one of said perpendicular sides to function as a depth scale when said protractor plate is removed from said outer casing.

14. The multi-function layout square according to claim 1, further comprising:

at least one permanent magnet mounted in said inner module and engaged with said metallic outer casing to impart magnetic properties to said outer casing and allow attachment of said layout square to metal objects.

15. The multi-function layout square according to claim 1, further comprising:

a mounting aperture in either of said outer casing first and second sides; and an internally threaded receptacle in said inner module aligned with said mounting aperture for receiving a mating male threaded fastener of a tripod mount to allow attachment of said layout square to a tripod.

16. The multi-function layout square according to claim 1, further comprising:

a semicircular slot outer casing in either of said outer casing second end and said inner module first end, sized to receive the side of a pencil.

* * * * *